United States Patent [19]

Bohusch

[11] 4,021,079

[45] May 3, 1977

[54] BLENDING VALVE FOR ELECTRO-PNEUMATIC BRAKES

[75] Inventor: Glen O. Bohusch, Watertown, N.Y.

[73] Assignee: General Signal Corporation, Rochester, N.Y.

[22] Filed: Dec. 18, 1975

[21] Appl. No.: 642,022

[52] U.S. Cl. .................................. 303/3; 303/15; 303/20

[51] Int. Cl.² ...................................... B60T 13/74

[58] Field of Search ............... 303/3, 15, 16, 20, 40

[56] References Cited

UNITED STATES PATENTS

| | | | |
|---|---|---|---|
| 2,151,924 | 3/1939 | Logan, Jr. ......................... | 303/3 X |
| 3,536,360 | 10/1970 | Engle ................................ | 303/3 |
| 3,536,361 | 10/1970 | Engle ................................ | 303/3 |
| 3,910,639 | 10/1975 | Engle ................................ | 303/3 |

Primary Examiner—George E. A. Halvosa
Attorney, Agent, or Firm—Pollock, Vande Sande & Priddy

[57] ABSTRACT

An electro-pneumatic brake valve includes counteracting torque motors which rotate a cam in response to friction brake pressure, dynamic braking effort and/or an electrical control signal. The cam actuates switching elements to apply or release the friction brakes via a pair of solenoid actuated valves which control fluid flow from the valve inlet to the friction brake actuators and from the friction brake actuators to vent.

9 Claims, 4 Drawing Figures

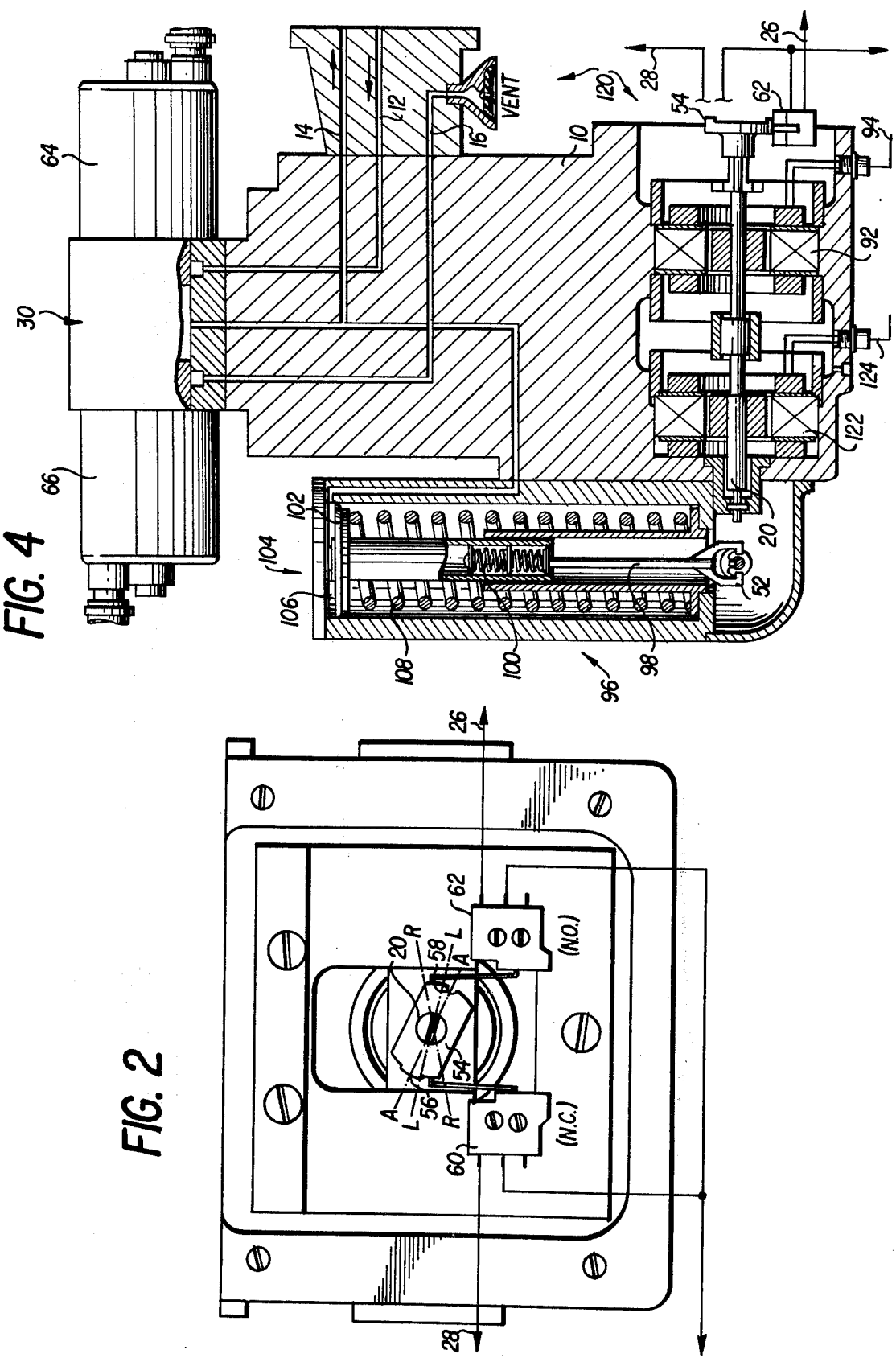

BLENDING VALVE FOR ELECTRO-PNEUMATIC BRAKES

BACKGROUND OF THE INVENTION

Rail car systems having both friction and dynamic brakes have been known for some time, and numerous attempts have been made to achieve a proper blending of the friction and dynamic braking efforts. U.S. Pat. No. 3,536,360 for Blending Scheme for Fluid-Operated and Dynamic Brakes, assigned to the assignee of this application, shows a number of prior art solutions to this problem, wherein brake signals are pneumatically relayed through the train. The prior art also teaches the concept of rail car brake systems wherein a brake application or release signal is conducted through the train by electrical wires rather than pneumatic conduits. In such instances, numerous attempts have been made to achieve a reliable transformation of the electrical signal into a fluid pressure brake application. Examples of such prior art systems are shown in U.S. Pat. No. 3,528,709 for Electric Current-to-Pneumatic Pressure Transducer, and U.S. Pat. No. 3,536,361 for Blending Scheme for Current Responsive Railway Brake, also assigned to the assignee of this application.

While the prior art devices have achieved a significant measure of success, significant drawbacks have been experienced. In the patented systems just mentioned, substantial air pressure losses have been experienced on long trains through the large number of pneumatically piloted supply and exhaust valves. Moreover, the response times of the prior art devices have been relatively long, which has diminished their acceptability for use in some applications. Finally, the pneumatic portions of the prior art systems have generally been rather complex and difficult to maintain in the required working order to minimize leakage losses and response times.

OBJECTS OF THE INVENTION

An object of the invention is to provide a brake valve which is simpler in construction and function than related prior art valves.

Another object of the invention is to provide a brake valve which responds more quickly to brake release and application signals than prior art valves.

A further object of the invention is to provide a brake valve in which pneumatic losses from the brake system are minimized.

These objects of the invention are only by way of example. Thus, those skilled in the art may perceive other advantages achieved or problems solved by the invention. Nevertheless, the scope of the invention is to be limited only by the appended claims.

SUMMARY OF THE INVENTION

The above objects and other advantages of the invention are achieved with the disclosed valve. One embodiment is particularly adapted for use in vehicles having electrical dynamic brakes, pneumatically applied friction brakes and a pneumatic control system for actuating the brakes. A housing is provided having pneumatic inlet, outlet and vent ports. A first torque motor is mounted within the housing and includes an output shaft for transmitting a torque proportional to the braking force applied by the dynamic brakes of the vehicle. A second torque motor acts upon the same output shaft and develops a torque opposite in sense to the first torque and proportional to the difference between the pressures acting at the inlet and outlet ports. The output shaft rotates a cam which opens and closes a pair of micro-switches. These, in turn, energize or de-energize solenoid-actuated supply and exhaust valves to direct pneumatic pressure to the friction braking system when the dynamic braking force is insufficient to satisfy a given brake demand, or to release the friction brakes when the dynamic braking force is sufficient. Upon loss of electrical power to the supply and exhaust valves, the system fails safe in that the supply valve is spring biased open and the exhaust valve is spring biased closed. Thus, this embodiment effectively blends the friction and dynamic braking effort for the vehicle.

A further embodiment of the invention is particularly adapted for use in vehicles having pneumatically applied friction brakes and an electrical control system for actuating the brakes. A first torque motor is provided which applies an output torque to a shaft, in inverse proportion to the pressure acting at the outlet port of the valve. A second torque motor, also acting on the same shaft, applies a torque opposite in sense to the first torque and proportional to the electrical control signal received from the electrical control system. A cam mounted on the output shaft opens and closes a pair of micro-switches. These, in turn, energize or de-energize a pair of solenoid-actuated supply and exhaust valves. Thus, this embodiment actuates the pneumatically applied brakes in response to an electrical control signal.

A further embodiment of the invention is particularly adapted for use in vehicles having both dynamic and friction brakes and an electrical control system for actuating the brakes, for the purpose of blending the dynamic and friction brake efforts. A first torque motor provides an output on a shaft in proportion to the pressure acting at the outlet port of the valve. A second torque motor acting on the same shaft applies a second torque opposite in sense to the first torque and proportional to an electrical control signal received from the brake control system. A third torque motor also acts on the output shaft and develops a third torque opposite in sense to the first torque and proportional to the braking force applied by the dynamic brakes of the vehicle. A cam is moved by the output shaft to actuate a pair of micro-switches. These, in turn, energize or de-energize a pair of solenoid-actuated supply and exhaust valve means, to blend the friction and dynamic braking efforts.

BRIEF DESCRIPTION OF THE DRAWINGS

FIG. 2 shows a view taken along line 2—2 of FIG. 1 indicating the orientation and cooperation between the cam and switching means of the invention. The same arrangement is used in the embodiments of FIGS. 3 and 4.

FIG. 4 shows an elevation, sectioned view of a blending valve according to the invention, which responds to an electrical control signal to blend dynamic and friction braking efforts.

DETAILED DESCRIPTION OF THE PREFERRED EMBODIMENTS

Figure 1:
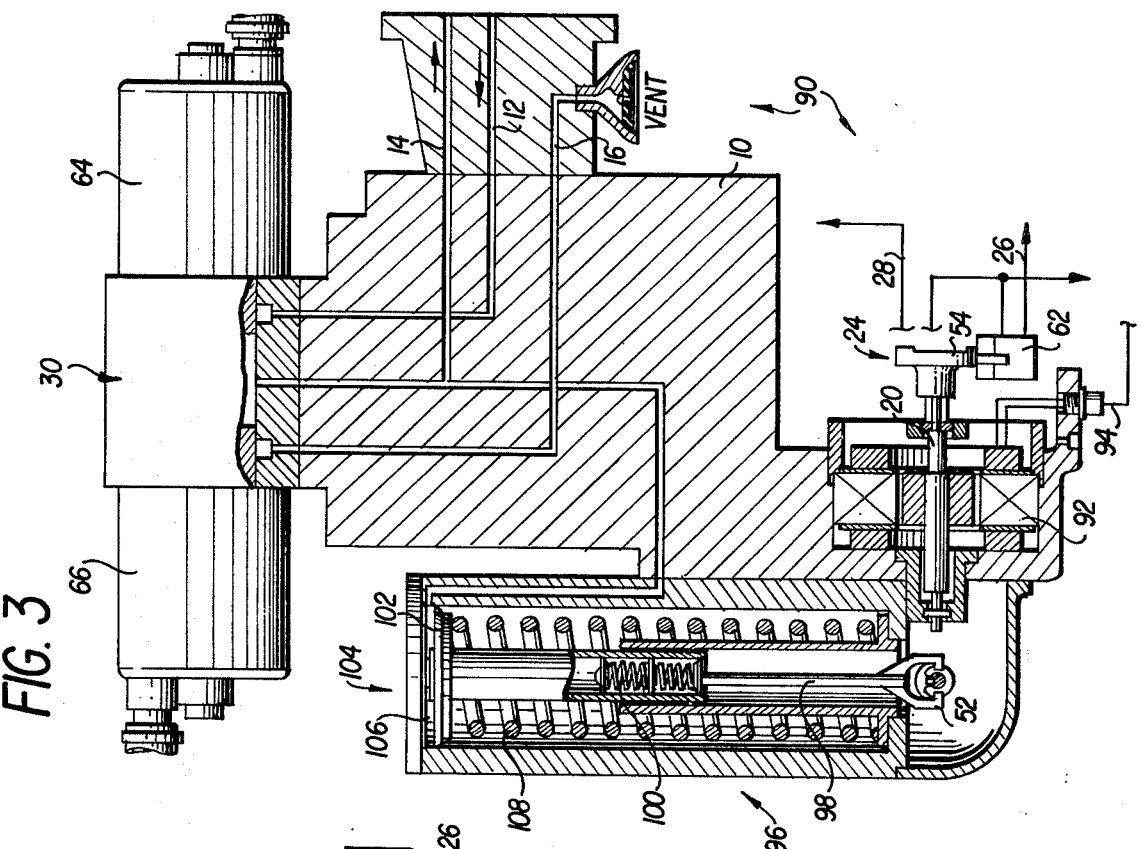
FIG. 1 shows an elevational, sectioned view of a blending valve according to the invention which responds to a pneumatic brake application and release signal to blend dynamic and friction braking efforts.

There follows a detailed description of the preferred embodiments of the invention, reference being made to the drawings in which like reference numerals identify like elements of structure in each of the several figures.

FIG. 1 shows an elevation, sectioned view of a blending valve or transducer 8, suitable for blending dynamic and friction braking efforts in response to a pneumatic control signal. The housing 10 includes an inlet port 12 which receives pressurized air at a pressure proportional to the desired total braking effort. In railcar applications, the pressurized air directed to inlet port 12 is provided by the conventional triple valve and relay valve known in the prior art (not shown). The outlet from blending transducer 8 is via outlet port 14 which, in use, would be connected to a conventional pneumatic brake actuator (not shown) or to a pneumatic-to-hydraulic convertor (not shown) which, in turn, would be connected to the brake actuator. To effect brake release, a vent port 16 is provided. Mounted in the lower portion of housing 10 is electrical torque motor 18 which applies a torque to comparator shaft 20. Torque motor 18 responds to the current in the resistor grid of the vehicle dynamic brakes (not shown), as described more fully in U.S. Pat. No. 3,536,360. Also acting on comparator shaft 20 is differential pneumatic torque motor 22 which applies a torque opposite in sense to that applied to electrical torque motor 18 and proportional to the difference between the pressures at inlet port 12 and outlet port 14. A cam and switch assembly 24 is driven by shaft 20 to control the flow of electrical current on APPLY control line 26 and RELEASE control line 28. A main valve assembly 30 includes a pair of solenoid-actuated valves for controlling pressurized air flow from inlet port 12 to outlet port 14 and from outlet port 14 to vent port 16.

Electrical torque motor 18 is of known design and comprises a permanent magnet rotor which rotates within a wound stator. The torque output of motor 18 is directly proportional to the magnitude of the current and the sine of the magnetic angle between adjacent unlike poles of the rotor and stator. The angular motion of comparator shaft 20 is limited by a pair of stops (not shown); therefore the sine of the magnetic angle is substantially constant, and the torque output of the motor will vary substantially linearly with current. In a typical case wherein the transducer employs a two pole motor, the magnetic angle is held between 72° and 90° regardless of the direction of rotation. Thus, the sine is always between 0.95 and 1.00, and the deviation from true linearity is only 5%. It should be noted that while torque motor 18 responds to the current flow through the resistor grid of the vehicle's dynamic brakes, it is usually connected across a shunt resistor in series with the grid and thus actually handles only a small portion of the grid current. The details of this connection are set forth in U.S. Pat. No. 3,536,360.

Differential pneumatic torque motor 22 comprises a drive rod 40 which is urged upward by a calibration spring 42 whose lower end is seated on a tubular extension of the piston assembly 44 of a pair of opposed, equal area air motors 46 and 48. The working spaces 46a and 48a of the motors are connected, respectively, with inlet port 12 and outlet port 14, so the assembly 44 is urged upward with a force proportional to the difference between pressures at these ports. This movement of assembly 44 is opposed by a meter spring 50 which is considerably stronger than calibration spring 42 and is chosen so that, for any given pressure differential within the design range of transducer 8, assembly 44 will assume a definite position in its cylinder. The upward force which calibration spring 42 exerts on drive rod 40 varies directly with the deflection of meter spring 50, and consequently is proportional to the difference between braking command and actual air brake effort. Calibration spring 42 is chosen so that it exerts a small force on drive rod 40 when the differential is a minimum and assembly 44 is in its lowest position, while, on the other hand, it applies a considerably larger force when the differential is a maximum and assembly 44 is in its uppermost position. At its lower end, drive rod 40 carries a yoke 52 which acts upon shaft 20 through one of a pair of knife edges located at opposite ends of a transverse arm fixed to the shaft. The knife edges are equally spaced from the axis of shaft 20 so that, regardless of the direction of rotation of shaft 20, motor 22 will apply the same resisting torque.

Referring now to FIG. 2, cam and switch assembly 24 is shown in the RELEASE position, indicated schematically by line R—R. A cam 54 is mounted on comparator shaft 20 and includes a RELEASE lobe 56 and an APPLY detent 58 which coact with a normally closed RELEASE switch 60 and a normally open APPLY switch 62. As illustrated, switch 60 is closed, thereby opening the exhaust valve; and switch 62 is closed, thereby closing the intake valve. In a preferred embodiment, lobe 56 is of approximately 20° duration and detent 58 is of approximately 9° duration. Lobe 56 is located diametrically opposite detent 58 and both lobe 56 and detent 58 are symmetric about a diameter. Thus, as cam 54 rotates counterclockwise, as illustrated, toward the LAP position, indicated schematically by line L—L, switch 60 will be opened by lobe 56; whereas, switch 62 will remain closed since its actuating finger has not yet entered detent 58. As cam 54 continues to rotate counterclockwise, however, the APPLY position, indicated schematically by line A—A, is eventually reached in which switch 60 remains open due to the effect of lobe 56 and switch 62 opens due to its actuating finger's dropping into detent 58. Thus, in the event of a loss of electrical power, the system will fail safe.

Referring again to FIG. 1, the main valve assembly 30 comprises a solenoid actuated supply valve 64. The solenoid of valve 64 is operatively connected to line 26 leading from switch 62. Also provided in a solenoid actuated exhaust valve 66, the solenoid portion of which is operatively connected to line 28 leading from switch 60. Valve 64 is a cartridge type valve which screws into housing 30 as indicated. The valve includes a central bore which slidably receives a carrier piston 68 having a valve washer assembly 70 attached thereto. As illustrated, an annular valve seat 72 is located to the left of and immediately adjacent to valve washer assembly 70, for closing communication between inlet port 12 and outlet port 14 when valve 64 is closed.

Similarly, valve 66 is a cartridge type valve including a central bore which slidably receives a carrier piston 74 having a valve washer assembly 76 attached thereto. As shown, valves 64 and 66 are coaxial. An annular valve seat 78 is located to the left of and adjacent to valve washer assembly 76 to close communication between outlet port 14 and vent port 16 when valve 66 is closed. A spring 80 is located in central plenum 82 between valves 64 and 66 and is captured between washer assemblies 70 and 76 so that, with both solenoids de-energized, valve 64 is biased open and valve 66 is biased closed. This ensures that the system will fail safe upon loss of electrical power. The details of a solenoid actuated valve suitable for this application are shown in co-pending application Ser. No. 616,097 for Magnetic Valve, filed Sept. 23, 1975 and assigned to the assignee of this application.

When the valve shown in FIG. 1 is in service and the pressure in the train brake pipe is at a maximum, the triple valve will cause the pressure in the line leading to inlet port 12 to be at its minimum, vented condition. With no torque applied by electrical torque motor 18, pneumatic torque motor 22 will move cam 54 to the APPLY position and hold it there until pressure again appears in the conduit leading to inlet port 12. In this position, solenoid valve 64 is energized to open communication between inlet port 12 and outlet port 14. Solenoid valve 66 is de-energized to close communication between outlet port 14 and vent port 16.

To apply the brakes, the motorman shifts the propulsion controller to the coast position, which places the dynamic brakes in an operative configuration and establishes a minimum dynamic braking effort. Torque motor 18 then tries to shift cam 54 toward the RELEASE position. The pressure in the brake pipe leading to the triple valve also is reduced at this time. The triple valve therefore raises the pressure in the piping leading to inlet port 12, an amount corresponding to the reduction in the brake pipe pressure. As the pressure at inlet port 12 rises, the pressure acting on air motor 46, at outlet port 14 and in the brake cylinder will also rise. Since the pressure acting on air motor 48 is at a minimum, pneumatic motor 22 will apply an opposing torque, initially tending to maintain cam 54 in the APPLY position. Thus, the brake cylinder pressure initially builds up and may become large enough to apply the friction brakes. As the dynamic braking effort increases, electric torque motor 18 will overpower pneumatic torque motor 22 and shift cam 54 to its RELEASE position. As shown in FIG. 2, this causes valve 64 to close and valve 66 to open, thereby releasing any pressure which initially may have built up downstream of outlet port 14 and releasing the brakes. In the present invention, the time delay from the beginning of the dynamic braking effort to the release of the friction brakes is substantially shortened.

Assuming the braking command can be satisfied by the dynamic brakes acting alone, torque motor 18 will hold cam 54 in the RELEASE position until the pressure downstream of outlet port 14 has totally dissipated and the torque of pneumatic motor 22 has risen to a level proportional to the pressure at inlet port 12. This higher torque output may or may not enable pneumatic torque motor 22 to shift cam 54 to the LAP position, because the torque developed by electric torque motor 18 depends upon train speed as well as the setting of the dynamic brake controller. In this embodiment of the invention, the field current of the dynamic brake is regulated in proportion to the outlet pressure of the triple valve, as more fully described in U.S. Pat. No. 3,536,360. If the two torques balance, cam 54 will assume the LAP position in which switch 60 is open and switch 62 is closed. On the other hand, if the torque of the electric torque motor is the higher of the two, cam 54 will remain in the RELEASE position.

Further reductions in the pressure in the brake pipe will produce corresponding increases in the pressure at inlet port 12 and also cause an increase in the field current of the dynamic brakes. This increases dynamic brake effort and the torque output of electric motor 18. As long as the braking command is within the capability of the dynamic brake, the output of pneumatic torque motor 22, which increases with the pressure at inlet port 12, will not exceed the output of electric torque motor 18. Therefore outlet port 14 and the brake cylinder will remain vented.

If the braking command is increased to a level which exceeds the capability of the dynamic brake, pneumatic torque motor 22 will overpower electric torque motor 18 and shift cam 54 to the APPLY position. As cam 54 moves from the RELEASE position through the LAP position, exhaust valve 66 will close when switch 60 opens. When switch 62 closes as cam 54 comes to the APPLY position, valve 64 will open. Now, air under pressure can flow through outlet port 14 to the brake cylinder and the pressure in the brake cylinder will commence to rise. Simultaneously, the pressure in working space 48a will increase and the torque output of the pneumatic torque motor 22 will begin to decrease. Accordingly, as the braking effort of the brake cylinder approaches the level required to compensate for the deficiency in the effort of the dynamic brake, electric torque motor 18 will rotate cam 54 toward the LAP position. When the sum of the efforts of the two brakes equals the braking command, the torques acting on shaft 20 will be balanced and cam 54 will come to rest in the LAP position.

The effectiveness of the dynamic brake may either increase or decrease while a brake application is in effect, depending upon the absolute speed of the train. In case of an increase in effectiveness, electric torque motor 18 will shift cam 54 to the RELEASE position, thereby opening exhaust valve 66 and closing inlet valve 64. If an air brake application is already in effect, this action will reduce the pressure in the brake cylinder and in the working space 48a of air motor 46. When the reduction in the braking effort of the cylinder offsets the increase in the effort of the dynamic brake, pneumatic torque motor 22 will return cam 54 to the LAP position and again permit spring 80 to close exhaust valve 66.

In the case of a decrease in dynamic brake effectiveness, pneumatic torque motor 22 will shift cam 54 to the APPLY position and thereby cause main supply valve 64 to open. This, of course, results in an increase in the braking effort of the cylinder. As before, the blending valve or transducer 8 will return to the LAP position when the change in the braking effort of the cylinder offsets the change in dynamic braking effort. Thus, if the prevailing braking command is large enough to require action by both brakes, blending transducer 8 will graduate the effort of the air brake as needed to substantially match the deficiency in the dynamic braking effort.

When the operator subsequently charges the brake pipe to release the brakes, the triple valve shifts to its exhaust position to dissipate the pressure in the conduit leading to inlet port 12. The decreasing pressure at inlet port 12 immediately causes a reduction in the output of pneumatic torque motor 22, so electric torque motor 18 rotates cam 54 to the RELEASE position and causes exhaust valve 66 to open. The pressure downstream of outlet port 14 is now dissipated through exhaust port 16. Simultaneously, or approximately simultaneously, the controller for the dynamic brake reduces the current supplied to the field of the traction motor. When the pressures in the conduits leading to inlet port 12 and leading from outlet port 14 have been dissipated completely, and the propulsion controller in the lead vehicle has been shifted back to a running position, both the dynamic and the pneumatic brakes will be released and the circuits of the dynamic brake will again be in the motoring configuration. Cam 54 will then shift to the APPLY position under the influence of pneumatic torque motor 22. It should be be remarked that if there is a failure in the dynamic brake which interrupts the current flow to torque motor 18, the pneumatic torque motor 22 will maintain cam 54 in the APPLY position and cause supply valve 64 to remain open. This ensures continuous communication between the brake cylinder and inlet port 12 and thus enables the system to afford normal automatic air brake operation.

Figure 3:
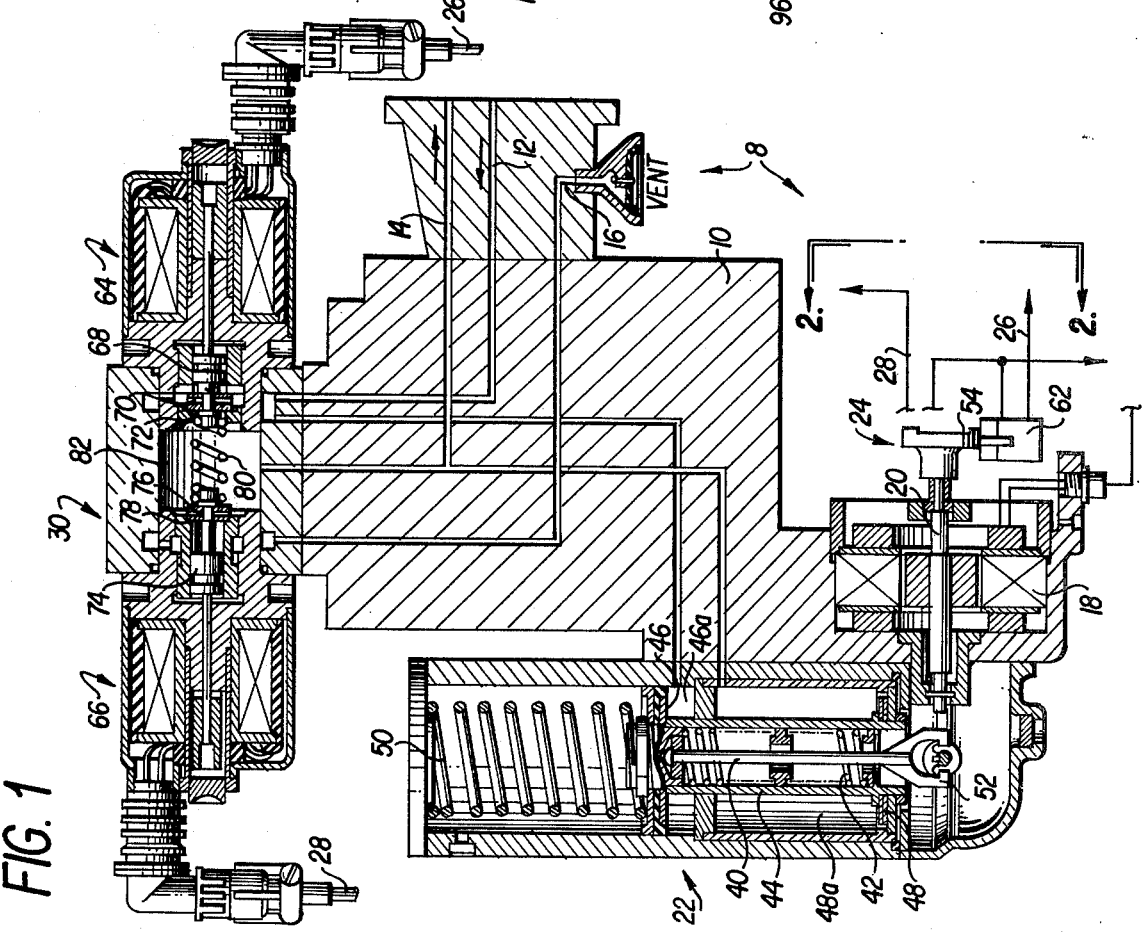
FIG. 3 shows an elevation, sectioned view of a brake control valve according to the invention which responds to an electrical signal to actuate pneumatic friction brakes.

Turning now to FIG. 3, the pneumatic brake control valve or transducer 90 according to the invention may be understood. The structure of transducer 90 is similar to that of transducer 8 in many respects, as indicated by the like reference numerals. In use, inlet port 12 is connected to a simple pneumatic charging system (not shown) rather than to a triple valve controller as in the case of the embodiment shown in FIG. 1. An electrical torque motor 92 is mounted in the lower portion of housing 10 and applies a torque to comparator shaft 20 in proportion to the magnitude of a signal existing on electric brake control or train line 94. When the current in the train line 94 is at its maximum, electrical torque motor 92 rotates comparator shaft 20 to its RELEASE position. A pneumatic torque motor 96 also acts on comparator shaft 20 and applies a torque of opposite sense to that applied by electrical torque motor 92, in proportion to the outlet pressure at outlet port 14.

Pneumatic torque motor 96 comprises a drive rod 98 which is urged upwardly by a calibration spring 100 whose lower end is seated on a tubular extension of the piston 102 of an air motor 104. The working space 106 of motor 104 is connected with the outlet passage 14 of transducer 90, so that motor responds to the pressure supplied to the brake cylinder. Downward movement of piston 102 is opposed by a meter spring 108 which is considerably stronger than calibration spring 100 and is chosen so that, for any given output pressure within the design range of the transducer, piston 102 will assume a definite position in its cylinder. The upward force which calibration spring 100 exerts on rod 98 varies inversely with the deflection of meter spring 108, and consequently is a negative function of transducer output pressure. Spring 100 is so designed that it exerts little or no force on rod 90 when output pressure is a maximum and piston 102 is in its lowest position, while, on the other hand, it applies a definite maximum force when the pressure in outlet passage 14 is zero and piston 102 is in its uppermost position. At its lower end, drive rod 98 carries a yoke 52 which acts upon shaft 20 through one of a pair of knife edges located at opposite ends of a transverse arm affixed to the shaft. The knife edges are spaced equally from the axis of shaft 20 so that, regardless of the direction of rotation of the shaft, motor 104 will apply the same resisting torque.

When transducer 90 is in use with the brakes released, the current in the train wire 94 is at a maximum; and torque motor 92 will hold cam 54 in its RELEASE position so that valve 64 will be closed and valve 66 will be open. As a result outlet port 14 and the brake cylinder will be vented to atmosphere through vent port 16. At this time, pneumatic torque motor 96 will be exerting a maximum restoring torque on comparator shaft 20.

When control wire current is reduced to affect a brake application, pneumatic torque motor 96 will overcome torque motor 92 and rotate cam 54 to the APPLY position, thereby causing valves 64 and 66 to open and close, respectively. This permits air to flow into outlet port 14 and thereby raises the pressure in the brake cylinder. The torque developed by pneumatic motor 96 decreases as outlet pressure rises. Therefore, when the output pressure reaches a level corresponding to the reduction in control wire current, electric motor 92 will have moved cam 54 to the LAP position in which both of the valves 64 and 66 are closed. If leakage should occur at the brake cylinder, the torque developed by pneumatic torque motor 96 will increase, thereby shifting cam 54 to the APPLY position and re-establishing the necessary pressure at outlet port 14.

When the control wire current is increased to the maximum value to release the brakes, electric motor 92 will shift cam 54 to, and hold it in, the RELEASE position. Since exhaust valve 66 stays open as long as cam 54 remains in the RELEASE position, it is evident that brake cylinder pressure will be dissipated completely without undue delay. The system will fail safe in the event of a loss of electrical power since pneumatic motor 96 will maintain cam 54 in its APPLY position.

Turning now to the embodiment shown in FIG. 4, a dynamic and friction brake blending valve or transducer 120 is illustrated. This valve is similar to transducer 90 in many respects, as reflected by the common reference numerals. Again, inlet port 12 is connected to a simple pneumatic charging system (not shown). A second electric torque motor 122 is provided which applies a torque to comparator shaft 20 in the same sense as that of torque motor 92. Torque motor 122 responds to the current in the resistor grid of the dynamic brake (not shown) in the same manner as previously discussed with respect to the embodiment shown in FIG. 1.

The operation of the embodiment shown in FIG. 4 is similar to that described for the previous embodiments. The operator shifts the propulsion controller to its coast position, to thereby switch the circuits of the dynamic brakes to the braking configuration and establish a minimum dynamic braking effort, thereby reducing the current in the control wire 94. This change in current reduces the torque output of electric motor 92 and also causes the controller for the dynamic brakes to increase the field current of the traction motors, as described more fully in U.S. Pat. No. 3,536,361. Since the traction motors act as generators and supply current to their resistor grids, electrical torque motor 122 now applies to comparator shaft 20 a torque which is proportional to grid current and which also urges cam 54 toward its RELEASE position. The current in the grid and consequently the torque output of the motor 122 depend upon train speed as well as the field current of the traction motor; thus, the increase in the output of torque motor 122 may be greater or less than the decrease in the output of torque motor 92.

If the speed of the train is such that the dynamic brake itself can satisfy the braking command, the torque developed by motor 122 will equal or exceed the reduction in the torque output of motor 92, and comparator shaft 20 will remain in the RELEASE position. In this case, the brake cylinder will remain vented. On the other hand, if the dynamic brake is incapable of supplying the braking effort called for by the operator, the torque output of motor 122 will not offset the reduction in the output of motor 92 and pneumatic torque motor 96 will rotate cam 54 to the APPLY position. This action opens valve 64 and closes valve 66. Inasmuch as exhaust valve 66 closed as supply valve 64 opened, the pressure in the brake cylinder and the working space 106 now begins to rise. As the braking force developed by the cylinder increases, piston 102 of air motor 104 moves down to thereby expand calibration spring 100 and reduce the torque which it applies to comparator shaft 20. Accordingly, as the braking effort of the cylinder approaches the level required to compensate for the deficiency in the output of the dynamic brake, electric torque motors 92 and 122 will rotate shaft 20 in the counterclockwise direction as viewed in FIG. 2 and move cam 54 toward the LAP position. When the sum of the outputs of the two brakes equals the selected braking effort, the torques acting on shaft 20 will be balanced and cam 54 will come to rest in the LAP position.

As previously discussed, the current in the resistor grid of the dynamic brake varies directly with the braking effort of the dynamic brake and is a maximum at an intermediate train speed. Thus, the torque output of motor 122 may either increase or decrease during the period of brake application. If the train is operating in the high speed range when the brakes are applied, the effectiveness of the dynamic brake will increase during the initial period of retardation and, if an application of the fluid operated brake was necessary originally to satisfy the braking command, transducer 120 will operate to reduce the pressure in the brake cylinder as train speed decreases. This effect is initiated by electric torque motor 122 which, in response to the rising current in the resistor grid, unbalances the torques acting on shaft 20 and shifts cam 54 to RELEASE position. When this happens valve 64 closes and valve 66 opens. As air escapes from transducer outlet passage 16, the pressure in the brake cylinder and in working space 106 decreases and the torque developed by pneumatic torque motor 96 increases. Therefore when the braking force developed by the brake cylinder has decreased sufficiently to offset the increase in dynamic brake output, pneumatic torque motor 96 will have returned to lap position. As long as the effectiveness of the dynamic brake continues to increase, transducer 120 will continuously bleed air from the brake cylinder in the manner just described and thereby gradually reduce the braking effort of the fluid operated brake.

After train speed has been reduced to a low level, further retardation will be accompanied by a decrease in the current in the resistor grid in the dynamic brake. This condition is commonly known as dynamic brake "fade". When the train enters this portion of the application cycle, the torque acting on shaft 20 will become unbalanced in the opposite sense, and pneumatic torque motor 96 will shift cam 54 to the APPLY position. Now, air under pressure is delivered to outlet port 14, so the pressure in the brake cylinder and in working space 106 rises. The rising pressure in space 106 affects a reduction in the torque output of pneumatic torque motor 96, therefore, when the braking effort of the fluid operated brake has increased sufficiently to offset the decrease in the output of the dynamic brake, torque motors 92 and 122 will return cam 54 to LAP position. Transducer 120 will continue to increase output pressure in this manner as long as the dynamic braking effort continues to decrease.

Tests have been conducted for transducers embodying the present invention, which indicate a substantial improvement in performance relative to the prior art systems. Considering particularly the embodiment of FIG. 1, tests have been run to determine the time required for the improved transducer 8 to release the friction brakes in response to an increase in dynamic braking effort at the beginning of a brake application. The following results have been obtained:

I. BRAKE APPLICATION FOR FIGURE I VALVE
(Increasing Dynamic Brake Effort)

| Stepped Current Inputs to Torque Motor 18 (Simulated Actuation of Dynamic Brake) | Time from Beginning of Dynamic Brake Actuation to Decrease in Pressure at Outlet Port 14 (Simulated Release of Friction Brake as Dynamic Brake Takes Over) | |
|---|---|---|
| | Invention | Prior Art (Pat. No. 3,536,360) |
| 0.5 amps | 0.351 sec. | no change |
| 1.0 amps | 0.118 sec. | 0.321 sec. |
| 1.5 amps | 0.045 sec. | 0.134 sec. |
| 2.0 amps | 0.045 sec. | 0.131 sec. |
| 2.5 amps | 0.042 sec. | 0.131 sec. |
| 3.0 amps | 0.041 sec. | 0.128 sec. |

II. BRAKE APPLICATION FOR FIGURE I VALVE
(Decreasing Dynamic Brake Effort)

| Stepped Current Inputs to Torque Motor 18 (Simulated Drop Out of Dynamic Brake) | Time from Beginning of Dynamic Brake Drop Out to Increase in Pressure at Outlet Port 14 (Simulated Application of Friction Brake as Dynamic Brake Drops Out |
|---|---|

-continued

|  | Invention | Prior Art (Pat. No. 3,536,360) |
|---|---|---|
| 3.0 amps | 0.043 sec. | 0.170 sec. |
| 2.5 amps | 0.034 sec. | 0.166 sec. |
| 2.0 amps | 0.038 sec. | 0.180 sec. |
| 1.5 amps | 0.038 sec. | 0.167 sec. |
| 1.0 amps | 0.030 sec. | 0.138 sec. |
| 0.5 amps | 0.036 sec. | 0.155 sec. |

Transducers as shown in FIGS. 3 and 4 also would exhibit similarly improved performance. From these test results, it is apparent that the transducers according to the present invention are far superior to those of the prior art since they respond to changes in dynamic braking effort or brake command signals (torque motor current) from two to three times more quickly than the prior art system. Moreover, minimum air losses are experienced with the present system since the pneumatically piloted valves have been eliminated.

Having described my invention in sufficient detail to enable those skilled in the art to make and use it, I claim:

1. An improved electro-pneumatic blending valve for a vehicle having dynamic and friction brakes, comprising;
   first torque motor means acting on an output shaft for developing a first torque proportional to the braking force applied by said dynamic brake;
   second torque motor means acting on said output shaft for developing a second torque opposite to said first torque and proportional to the difference between the pressures acting at the inlet and outlet ports of said valve;
   solenoid actuated supply valve means for controlling communication between said inlet port and said outlet port;
   solenoid actuated exhaust valve means for controlling communication between said outlet port and a vent port;
   spring means biasing said supply valve means to its open position and said exhaust valve means to its closed position;
   first switch means for selectively connecting power to said supply valve means;
   second switch means for selectively connecting power to said exhaust valve means;
   cam means moved by said output shaft for actuating said first switch means to open said supply valve means to supply pressurized fluid via said supply valve means to said outlet port; and for actuating said second switch means to open said exhaust valve means to release pressurized fluid through said outlet port via said exhaust valve means to said vent port, said cam means having contact surfaces cooperating with said first and second switch means for simultaneously opening said supply valve means and closing said exhaust valve means in the APPLY position of said blending valve, or closing said supply valve means and said exhaust valve means in the LAP position of said blending valve, or closing said supply valve means and opening said exhaust valve means in the RELEASE position of said blending valve.

2. A valve according to claim 1, wherein said supply valve means comprises a first axially movable valve carrier and a first valve seat and said exhaust valve means comprises a second axially movable valve carrier and a second valve seat, said valve carriers being coaxially aligned and said spring means being located between said valve carriers to bias said first valve carrier away from said first seat and said second valve carrier toward said second seat.

3. A valve according to claim 2, wherein said supply valve has a first inlet and a first outlet, said exhaust valve has a second inlet and a second outlet, said first inlet being connected to said inlet port and said second outlet being connected to said vent port; further comprising a plenum in said blending valve, said plenum being connected to said first outlet and said second inlet, said spring means being located within said plenum.

4. An improved electro-pneumatic brake control valve for a vehicle having pneumatically applied friction brakes and an electrical control system for actuating said brakes, comprising:
   first torque motor means acting on an output shaft for developing a first torque inversely proportional to the pressure acting at the outlet port of said valve;
   second torque motor means acting on said output shaft for developing a second torque opposite to said first torque and proportional to an electrical control signal received from said electrical control system;
   solenoid actuated supply valve means for controlling communication between the inlet port of said valve and said outlet port;
   solenoid actuated exhaust valve means for controlling communication between said outlet port and a vent port;
   spring means biasing said supply valve means to its open position and said exhaust valve means to its closed position;
   first switch means for selectively connecting power to said supply valve means;
   second switch means for selectively connecting power to said exhaust valve means;
   cam means moved by said output shaft for actuating said first switching means to open said supply valve means to supply pressurized fluid via said supply valve means to said outlet port; and for actuating said second switch means to open said exhaust valve means to release pressurized fluid through said outlet port via said exhaust valve means to said vent port, said cam means having contact surfaces cooperating with said first and second switch means for simultaneously opening said supply valve means and closing said exhaust valve means in the APPLY position of said control valve, or closing said supply valve means and said exhaust valve means in the LAP position of said control valve, or closing said supply valve means and opening said exhaust valve means in the RELEASE position of said control valve.

5. A valve according to claim 4, wherein said supply valve means comprises a first axially movable valve carrier and a first valve seat and said exhaust valve means comprises a second axially movable valve carrier and a second valve seat, said valve carriers being coaxially aligned and said spring means being located between said valve carriers to bias said first valve carrier away from said first seat and said second valve carrier toward said second seat.

6. A valve according to claim 5, wherein said supply valve has a first inlet and a first outlet, said exhaust valve has a second inlet and a second outlet, said first inlet being connected to said inlet port and said second outlet being connected to said vent port; further comprising a plenum in said control valve, said plenum being connected to said first outlet and said second inlet, said spring means being located within said plenum.

7. An improved electro-pneumatic brake control and blending valve for a vehicle having dynamic and friction brakes, and an electrical control system for actuating said brakes, comprising:
 first torque motor means acting on an output shaft for developing a first torque proportional to the pressure acting at the outlet port of said valve;
 second torque motor means acting on said output shaft for developing a second torque opposite to said first torque and proportional to an electrical control signal received from said electrical control system;
 third torque motor means acting on said output shaft for developing a third torque opposite to said first torque and proportional to the braking force applied by said dynamic brake;
 solenoid actuated supply valve means for controlling communication between the inlet port of said valve and said outlet port;
 solenoid actuated exhaust valve means for controlling communication between said outlet port and a vent port;
 spring means biasing said supply valve means to its open position and said exhaust valve means to its closed position;
 first switch means for selectively connecting power to said supply valve means;
 second switch means for selectively connecting power to said exhaust valve means;
 cam means moved by said output shaft for actuating said first switching means to open said supply valve means to supply pressurized fluid via said supply valve means to said outlet port; and for actuating said second switch means to open said exhaust valve means to release pressurized fluid through said outlet port via said exhaust valve means to said vent port, said cam means having contact surfaces cooperating with said first and second switch means for simultaneously opening said supply valve means and closing said exhaust valve means in the APPLY position of said brake control and blending valve, or closing said supply valve means and said exhaust valve means in the LAP position of said brake control and blending valve, or closing said supply valve means and opening said exhaust valve means in the RELEASE position of said brake control and blending valve.

8. A valve according to claim 7, wherein said supply valve means comprises a first axially movable valve carrier and a first valve seat and said exhaust valve means comprises a second axially movable valve carrier and a second valve seat, said valve carriers being coaxially aligned and said spring means being located between said valve carriers to bias said first valve carrier away from said first seat and said second valve carrier toward said second seat.

9. A valve according to claim 8, wherein said supply valve has a first inlet and a first outlet, said exhaust valve has a second inlet and a second outlet, said first inlet being connected to said inlet port and said second outlet being connected to said vent port; further comprising a plenum in said brake control and blending valve, said plenum being connected to said first outlet and said second inlet, said spring means being located within said plenum.

* * * * *